United States Patent
Wise et al.

(10) Patent No.: US 8,002,487 B2
(45) Date of Patent: Aug. 23, 2011

(54) SPREADABLE FOOD DISPENSER

(75) Inventors: Alexander Sterling Wise, Mentor, OH (US); Francis Kiss deVirag, Kirtland Hills, OH (US); Ileen Rosner, Novelty, OH (US); Jonathan Rosner, Novelty, OH (US)

(73) Assignee: Innovative Consumer Solutions, LLC, Novelty, OH (US)

( * ) Notice: Subject to any disclaimer, the term of this patent is extended or adjusted under 35 U.S.C. 154(b) by 167 days.

(21) Appl. No.: 11/847,242

(22) Filed: Aug. 29, 2007

(65) Prior Publication Data

US 2008/0121665 A1    May 29, 2008

Related U.S. Application Data

(60) Provisional application No. 60/823,855, filed on Aug. 29, 2006.

(51) Int. Cl.
*B65D 88/54* (2006.01)
(52) U.S. Cl. ........ 401/265; 401/263; 401/175; 222/333; 222/390
(58) Field of Classification Search .......... 222/333, 222/390, 386, 129, 131, 182, 183, 145.3, 222/145.1, 325–327; 401/175, 265, 263
See application file for complete search history.

(56) References Cited

U.S. PATENT DOCUMENTS

| | | | | |
|---|---|---|---|---|
| 835,606 A * | 11/1906 | Frimand | ................. | 222/390 |
| 2,320,496 A * | 6/1943 | Wechsler | ................. | 425/461 |
| 2,980,247 A * | 4/1961 | Di Giantomasso | ............. | 401/79 |
| 3,162,884 A * | 12/1964 | Bordwine et al. | ............. | 401/12 |
| 3,774,816 A * | 11/1973 | Bratton | ................. | 222/391 |
| 4,544,083 A * | 10/1985 | Schroeder | ................. | 222/47 |
| 6,039,483 A * | 3/2000 | Szekely | ................. | 401/50 |
| 6,152,632 A * | 11/2000 | Shimakage et al. | ............. | 401/72 |
| 6,543,953 B1 * | 4/2003 | Kim | ................. | 401/75 |
| 6,599,293 B2 * | 7/2003 | Tague et al. | ................. | 606/94 |
| 6,619,508 B2 * | 9/2003 | Balcome et al. | ............. | 222/136 |
| 6,701,828 B1 * | 3/2004 | Burns et al. | ................. | 99/450.2 |
| 7,325,994 B2 * | 2/2008 | Liberatore | ................. | 401/266 |
| 7,478,736 B2 * | 1/2009 | Morgan | ................. | 222/107 |
| 2005/0178796 A1 * | 8/2005 | Shraiber | ................. | 222/78 |
| 2008/0101850 A1 * | 5/2008 | Wojcik et al. | ................. | 401/265 |
| 2008/0131191 A1 * | 6/2008 | deVirag et al. | ................. | 401/171 |
| 2008/0247805 A1 * | 10/2008 | deVirag et al. | ................. | 401/139 |

* cited by examiner

*Primary Examiner* — Kevin P Shaver
*Assistant Examiner* — Donnell Long
(74) *Attorney, Agent, or Firm* — Turocy & Watson, LLP

(57) ABSTRACT

A dispenser for spreadable foodstuffs or spreadable non-food substances allowing for spreading without the need for additional utensils that are not part of the packaging is disclosed. Dispenser is easily refilled with replaceable cartridges and designed to keep food away from air as contents are dispensed.

15 Claims, 3 Drawing Sheets

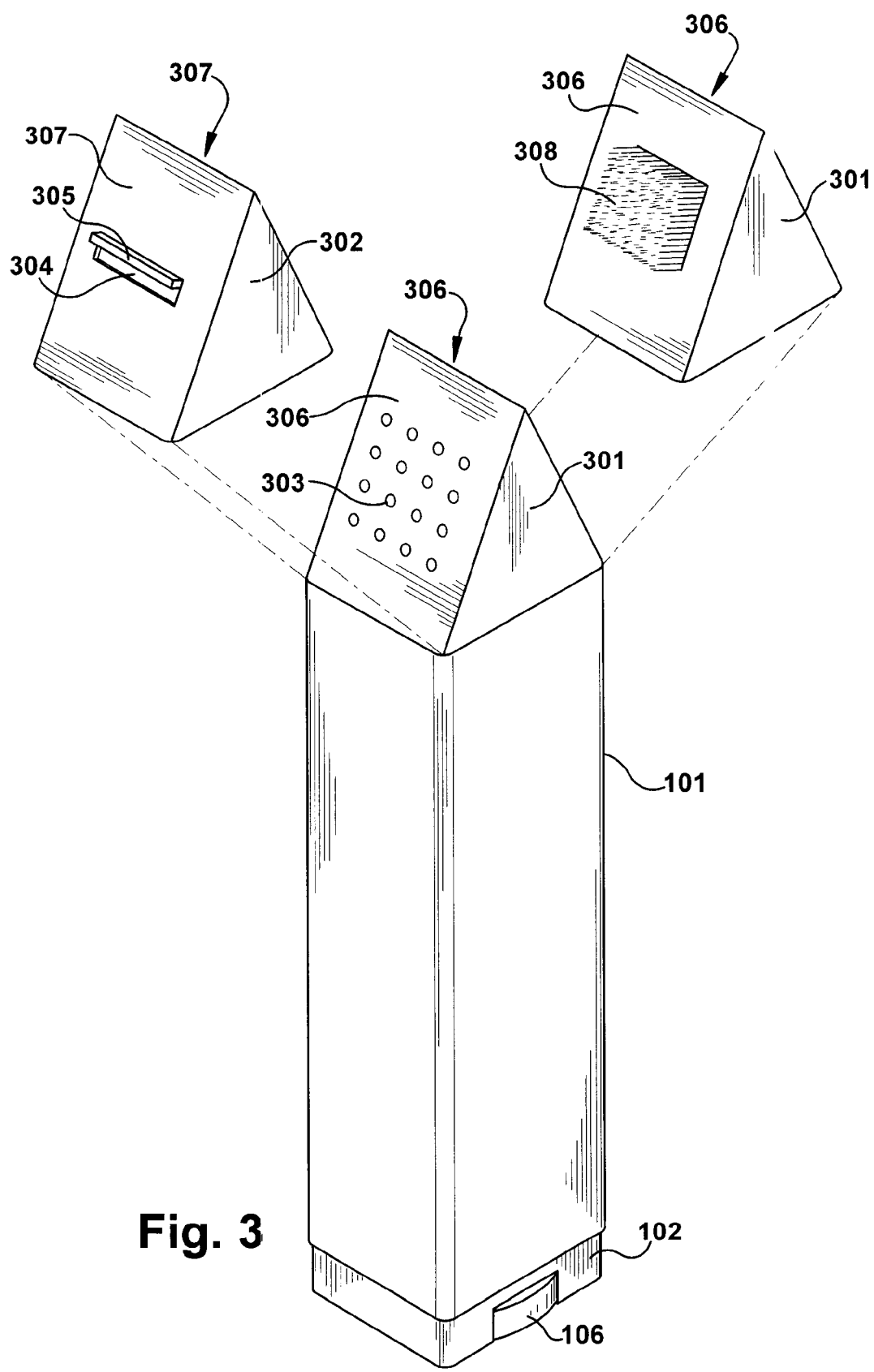

SPREADABLE FOOD DISPENSER

TECHNICAL FIELD

The subject invention generally relates to a device for dispensing food products. In particular, the subject invention relates to dispensing spreadable foodstuffs evenly from a container without the use of a knife or other utensils not part of the food packaging.

BACKGROUND

The vast majority of packaging of spreadable foodstuffs lack any functionality to allow contents to be used directly from the packaging. The packaging for spreadable foodstuffs such as ketchup, mustard, cream cheese, peanut putter, jelly, ect. typically require a knife or other utensil not part of the food packaging to remove the foodstuff from a container and/or achieve spreading the foodstuff as desired. Even containers that allow for squeezing the foodstuff contained therein directly out of the packaging often still require a utensil not part of the food packaging to evenly spread the foodstuff. Such containers also often do not dispense foodstuffs easily as the void space of the container increases as foodstuff is consumed. Often the contents may splatter or take a significant amount of time to flow due to a large volume of air in the container. Air being introduced to the container during the products use also negatively affects product freshness.

Traditional food containers are also typically challenging for children, elderly, disabled, or physically challenged individuals to use. Such containers also require utensils to be washed after every minor use of the product, which is a particular inconvenience during such activities as traveling, picnics, or other occasions where typical kitchen amenities are not present in addition to individuals who do not own a dishwasher.

The invention is also designed for use with a variety of non-food semi-solid or gelatinous substances. These substances include but are not limited to toothpaste, shoe polish, paints, cosmetics, thick oils, topical medications, and emollients. The typical containers for these substances are often the same and have the same limitations as those used for foodstuffs. These main limitations being the need for an additional utensils to remove and use the substance from the container, air being introduced to the containers over time as the substance is used, and difficulty of use for children or individuals with physical limitations.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

The subject invention provides for spreadable foodstuffs and spreadable non-food substances to be packaged in a container that has a means for spreading the contained foodstuff in a knife-like manner without the use of any additional utensils separate from the packaging as well as providing for a packaging of adjustable volume such that product is kept away from air during use.

One aspect of the invention relates to providing a convenient means of use of spreadable foodstuffs and non-food substances in residences without the need for utensils. An additional aspect of the invention relates to providing a convenient and easy to use means of spreadable foodstuffs and non-food substances for elderly, disabled, children, and physically challenged persons.

Another aspect of the invention relates to providing a convenient means of use of spreadable foodstuffs and non-food substances for those traveling, picnics or other outdoor activities, or other times when traditional home amenities are not available. Yet another aspect of the invention relates to providing a means for restaurants and caterers to dispense and use spreadable foodstuffs with greater speed.

Still yet another aspect of the invention relates to providing a packaging for spreadable foodstuffs and non-food substances that keeps contents fresher once the seal on the package has been broken and is in use. Another aspect of the invention relates to minimizing product waste compared to traditional packaging. An additional aspect of the invention is to provide a packaging that is less disposable than traditional packaging, and therefore, suitable for targeted and affinity marketing in a more affective manner.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF SUMMARY OF THE DRAWINGS

FIG. 3 is a view of another aspect the invention assembled for use with an applicator component shown as an insert.

DETAILED DESCRIPTION

Figure 1:
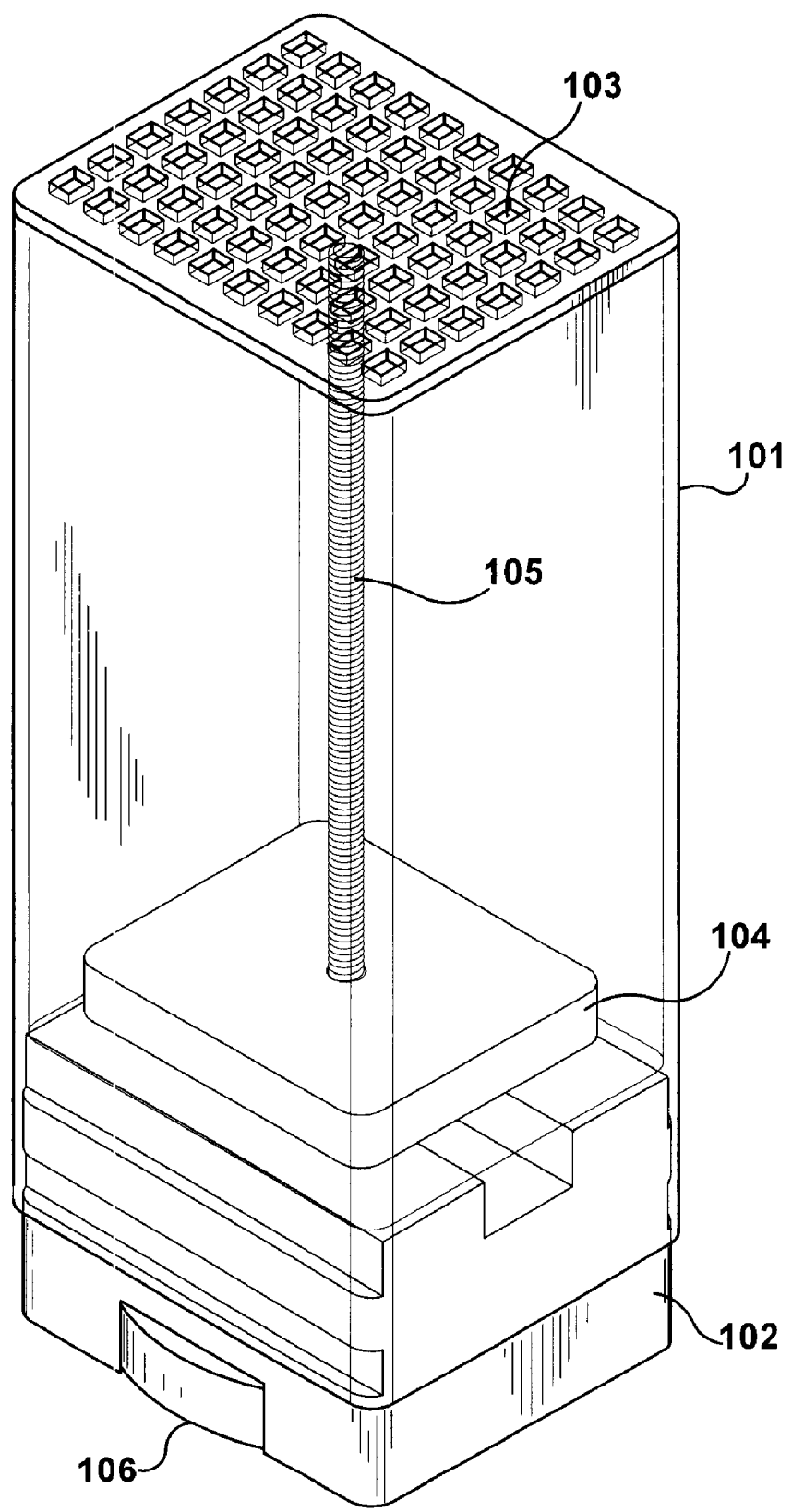
FIG. 1 is a view of the dispenser portion in one aspect of the invention with body shown transparent to reveal internal components.

The food packaging is composed of an approximately rectangular dispenser with a long longitudinal axis and mostly hollow. One end of the dispenser forms a base and the other end contains a grid and openings through which spreadable foodstuffs exit the dispenser. The base of the dispenser is detachable from the rest of the body of the dispenser. A screw-spindle is attached to the base and lies along the longitudinal axis of the dispenser when the base and body of the dispenser are attached. The base of the dispenser has a flat member forming an elevator and a mechanism is contained within the base such that the elevator member travels along the screw-spindle upon turning of a wheel on the base. In an additional embodiment of the invention, an electric motor and battery is contained within the base of the dispenser such that the screw-spindle turns upon depressing a button located on the housing of the dispenser and moves the elevator member along the screw-spindle. The movement of the elevator member along the longitudinal axis causes spreadable foodstuffs on non-food substances to move through the grid at the end of the body of the dispenser. The movement of the elevator member also causes a decrease in the volume inside the dispenser equal to the volume of contents dispensed. In this manner, air is kept out of contact with the foodstuffs on non-food substances.

The actual foodstuffs or non-food substances are purchased by a consumer as a refill cartridge product (RCP). The dispenser described above may be sold to consumers with or without an RCP in the dispenser. In either situation, the dispenser is designed for more than one use and may be refilled using said RCPs. The dispenser may be adorned with certain affinity advertising (celebrities, sports teams, movies, ect) and have a longer impact relative to such advertisements placed on traditional disposable containers. The shape of the dispenser itself may be shaped to have an affinity or novelty quality (i.e., a baseball bat).

The RCP itself is formed of a body with a size and shape that will tightly fit inside the dispenser when the base of the dispenser is removed. One end of the RCP has a lid that is removed by the consumer prior to placing in the dispenser. The other end of the RCP has a plunger member that lies flush against the first elevator member of the dispenser when the RCP is sealed inside the dispenser. The plunger member of the RCP has a hole to accommodate the screw spindle. Upon operating the dispenser, the elevator member of the dispenser presses against and moves the plunger member of the RCP to dispense product. After insertion of a replacement RCP, the device is ready to dispense again.

The dispenser may be produced with different grids or tops attached to the dispensing end (applicator component), which are suitable for different spreadable foodstuffs, spreadable non-food substances and utilities. The applicator component may either be detachable from the body of the dispenser or permanently molded into the body of the dispenser. Specifically, the size and pattern of openings on the dispenser top are optimized based on the viscosity of the product being dispensed.

The dispenser of the present invention is depicted in FIG. 1. The body of the dispenser 101 along with the majority of the device is composed of rigid food grade material or chemical resistant material as needed by the application. The body of the dispenser 101 can be detached from the base of the dispenser 102. The end of the dispenser opposite from the base has a series of openings 103 that allow for foodstuffs or non-food substances to exit from the dispenser. Attached to the base of the dispenser 102 are an elevator member 104 and a threaded screw-spindle 105. The elevator member 104 moves along the screw-spindle 105 upon turning a wheel 106 that in turn rotates the screw-spindle 105. Means for accomplishing turning the screw-spindle 105 upon turning wheel 106 are well known in the art. In a second embodiment, the screw-spindle 105 is powered by an electric motor placed within the base of the dispenser 102. Means for combining the screw-spindle 105 with an electric motor are well known in the art. A battery may be placed inside the base and a button for activating the motor may be placed anywhere on the dispenser deemed convenient. The battery may be rechargeable from a DC power source for high use applications such as restaurants.

Figure 2:
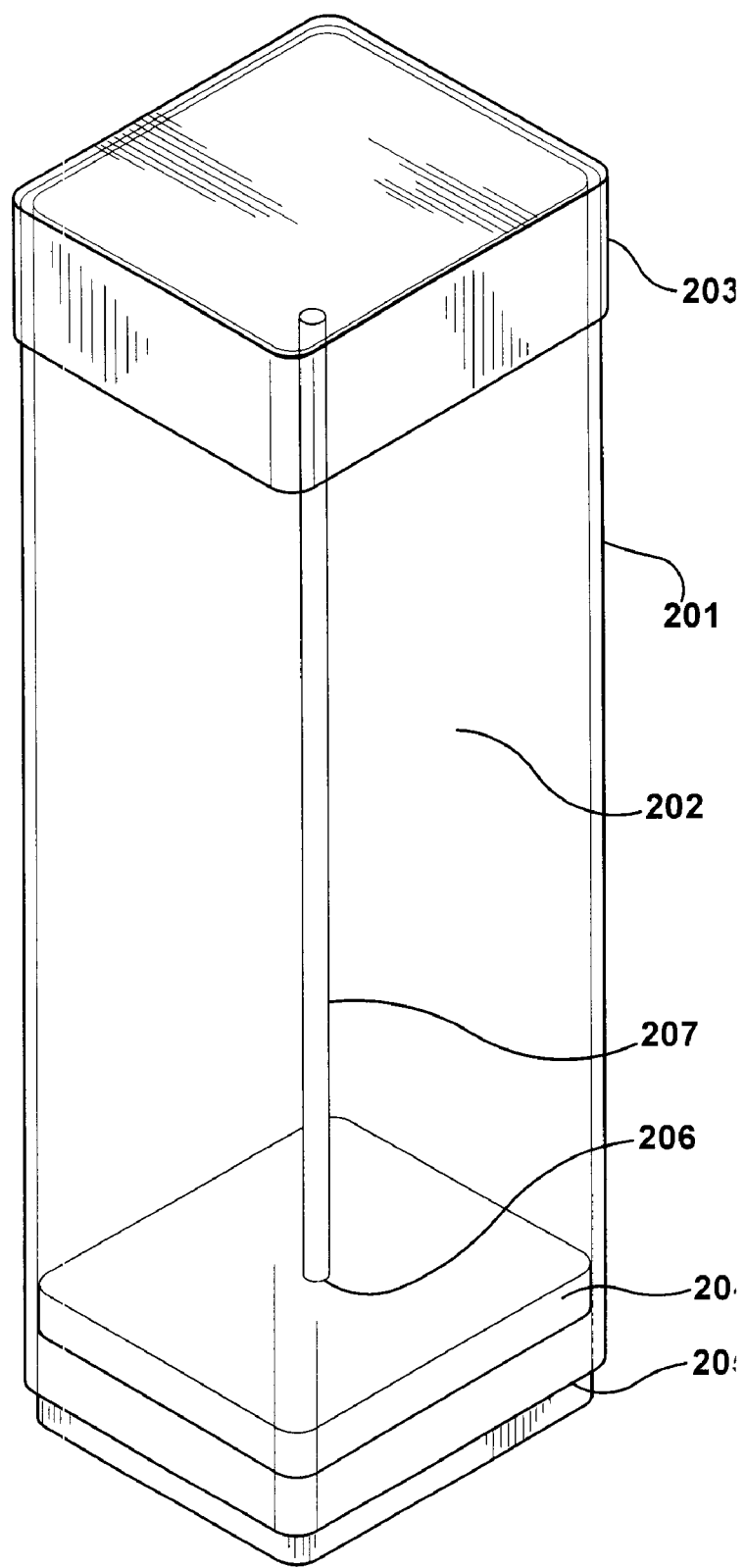
FIG. 2 is a view of the RCP portion in one aspect of the invention with body shown transparent to reveal internal components.

The refill cartridge product (RCP) is depicted in FIG. 2. The body 201 and majority of the RCP is formed of food grade plastic material or chemical resistant material. The RCP is shaped and designed to fit within the dispenser shown in FIG. 1. The RCP mostly comprises a hollow space 202 which contains the spreadable foodstuff or non-food substance. The contents are kept fresh by a lid 203 before the RCP is place in use. The lid 203 may be replaceable such that the RCP may be taken out of the dispenser and stored before the contents are completely consumed. The RCP has a plunger member 204 and a lip 205 surrounding the bottom the RCP. The plunger member 204 and the lip 205 are design such that the first elevator member of the dispenser 104 fits snuggly within the lip 205 and flush against the plunger member 204. The plunger member 204 has a hole 206 at the center of the member through which the screw-spindle 105 may pass. A tube 207 may be built into the RCP along the longitudinal axis to prevent the screw spindle from contacting the foodstuff or non-food substance contained in the hollow space 202. The plunger member 204 fits snuggly against the body 201 of the RCP. Pressure from the first elevator member 105 causes plunger member 204 to move along the longitudinal axis of the RCP while remaining in tight contact with the body 201 of the RCP.

The dispensing end of the dispenser 103 is composed of a series of holes whose diameter is selected based on the consistency and viscosity of the product dispensed. An applicator component may either be detachable from the dispensing end of the dispenser 103 or molded as part of the body 101. If molded as part of the body 101, the grid at the dispensing end 103 may optionally be omitted. The dispensing end, as shown in FIG. 3, has a pyramidal shape 301 or 302 with openings. The diameter of the openings and the number of openings is selected based on the consistency or viscosity of the product. A relatively large number of smaller holes 303 are useful for less viscose products such as jelly, ketchup or emollients. A low number or single large hole 304 is appropriate for very viscose products such as peanut butter, cream cheese or shoe polish. For viscose products, an optional lip 305 maybe include to assist in detaching or separating the dispensed product from the dispenser. The flat surface of the applicator 306 or 307 is used in a knife-like fashion to spread the dispensed product as desired. A non-stick material is preferably used to aid in easy clean-up after spreading. Additionally, certain applications, such as shoe polish or paints, may benefit from built-in bristles or brushes on the container. Such bristles or brushes 308 may be conveniently placed on the flat surfaces 306 or 307 of the applicator.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A dispensing system for spreadable foodstuffs allowing for spreading without additional utensils comprising:
   a first container comprising a food grade plastic material having a longitudinal central axis having a dispensing end with one or more openings, the dispensing end having a pyramidal shape for dispensing and spreading spreadable foodstuffs,
   the first container further comprises a screw-spindle arranged along the longitudinal axis of said first container and an elevator member attached to said screw-spindle;
   a replaceable lid for covering the one or more openings of the first container;
   a second container having a shape and dimensions to fit within the first container, the second container having an opening for dispensing spreadable foodstuffs and a removable and reusable lid to extend shelf life of spreadable foodstuffs contained therein;

the second container further comprises a plunger member located opposite the opening for dispensing spreadable foodstuffs and a tube arranged along the longitudinal axis of said second container in which the screw spindle of the first container is inserted, wherein the plunger member contains a hole to allow the screw-spindle to pass through, and wherein the elevator member of the first container presses against the plunger member of the second container when the first container is fitted within the first container.

2. The dispensing system according to claim 1 wherein, the first container further comprises a detachable base to allow for the insertion or removal of said second container.

3. The dispensing system according to claim 1 wherein, the screw-spindle is rotated via an electric motor or by a graduated wheel for indicating degree of dispensing spreadable foodstuffs.

4. The dispensing system according to claim 1 wherein, the second container is refillable with spreadable foodstuffs.

5. The dispensing system of claim 1, wherein the size and pattern of the at one or more openings of the first container are selected based on the viscosity of the spreadable foodstuffs to be dispensed there through.

6. A dispensing system for spreadable foodstuffs allowing for spreading without additional utensils comprising:
a first container comprising a food grade plastic material having a longitudinal central axis having one or more openings for dispensing spreadable foodstuffs,
the first container further comprises a screw-spindle arranged along the longitudinal axis of said first container and an elevator member attached to said screw-spindle;
the first container comprises a fixed applicator component having a pyramidal shape for dispensing and spreading spreadable foodstuffs comprising a dispensing end and an open end wherein the open end is in register with the opening of the first container, and wherein the pyramidal shape dispensing end comprises at least one flat surface for spreading of the spreadable foodstuffs and one or more openings through which the spreadable foodstuffs can be dispensed;
a replaceable lid for covering the one or more openings of the first container;
a second container having a shape and dimensions to fit within said first container, the second container having an opening for dispensing spreadable foodstuffs and a removable and reusable lid to extend shelf life of spreadable foodstuffs or spreadable non-food substances contained therein; and
wherein the second container further comprises a plunger member located opposite said opening for dispensing spreadable foodstuffs and a tube arranged along the longitudinal axis of said second container in which the screw spindle of the first container is inserted, wherein the plunger member contains a hole to allow the screw-spindle to pass through, and wherein the elevator member of the first container presses against the plunger member of the second container when the first container is fitted within the first container.

7. The dispensing system according to claim 6 wherein, the first container further comprises a detachable base to allow for the insertion or removal of said second container.

8. The dispensing system according to claim 6 wherein, the screw-spindle is rotated via an electric motor or by a graduated wheel for indicating degree of dispensing spreadable foodstuffs.

9. The dispensing system according to claim 6 wherein, the second container is refillable with spreadable foodstuffs.

10. The dispensing system of claim 7 wherein, the detachable base is used with at least one second container.

11. The dispensing system of claim 6, wherein the size and pattern of the at one or more openings of the fixed applicator are selected based on the viscosity of the spreadable foodstuffs to be dispensed there through.

12. A method of dispensing and applying spreadable foodstuffs comprising;
providing a first dispensing container having a dispensing end;
providing a second container comprising a food grade plastic material having a shape and dimensions to fit within said first container, the second container is filled with a spreadable foodstuff, the second container has a dispensing end, the dispensing end having a pyramidal shape with at least one opening, the at least one opening is sealed with a removable and reusable lid;
removing the lid of the second container and inserting the second container within the first container;
rotating a screw-spindle to raise an elevator of the first container, the elevator applies force to a second container plunger thereby creating pressure inside the second container to dispense by force the spreadable foodstuffs of the second container;
wherein the second container can be removed from the first container prior to complete exhaustion of the spreadable foodstuff, re-sealed with the removable and reusable lid, stored, and reused with the first container.

13. The method in accordance with claim 12 further comprising;
attaching an applicator component to the first container after the step of inserting the second container and dispensing the spreadable foodstuffs through an applicator component, the applicator component comprises at least one opening for dispensing.

14. The method in accordance with claim 12 further comprising dispensing the spreadable foodstuffs by rotating the screw-spindle via an electric motor or by a graduated wheel for indicating degree of dispensation.

15. The method in accordance with claim 13 further comprising, spreading the spreadable foodstuffs with an angled face of the applicator component.

* * * * *